UNITED STATES PATENT OFFICE.

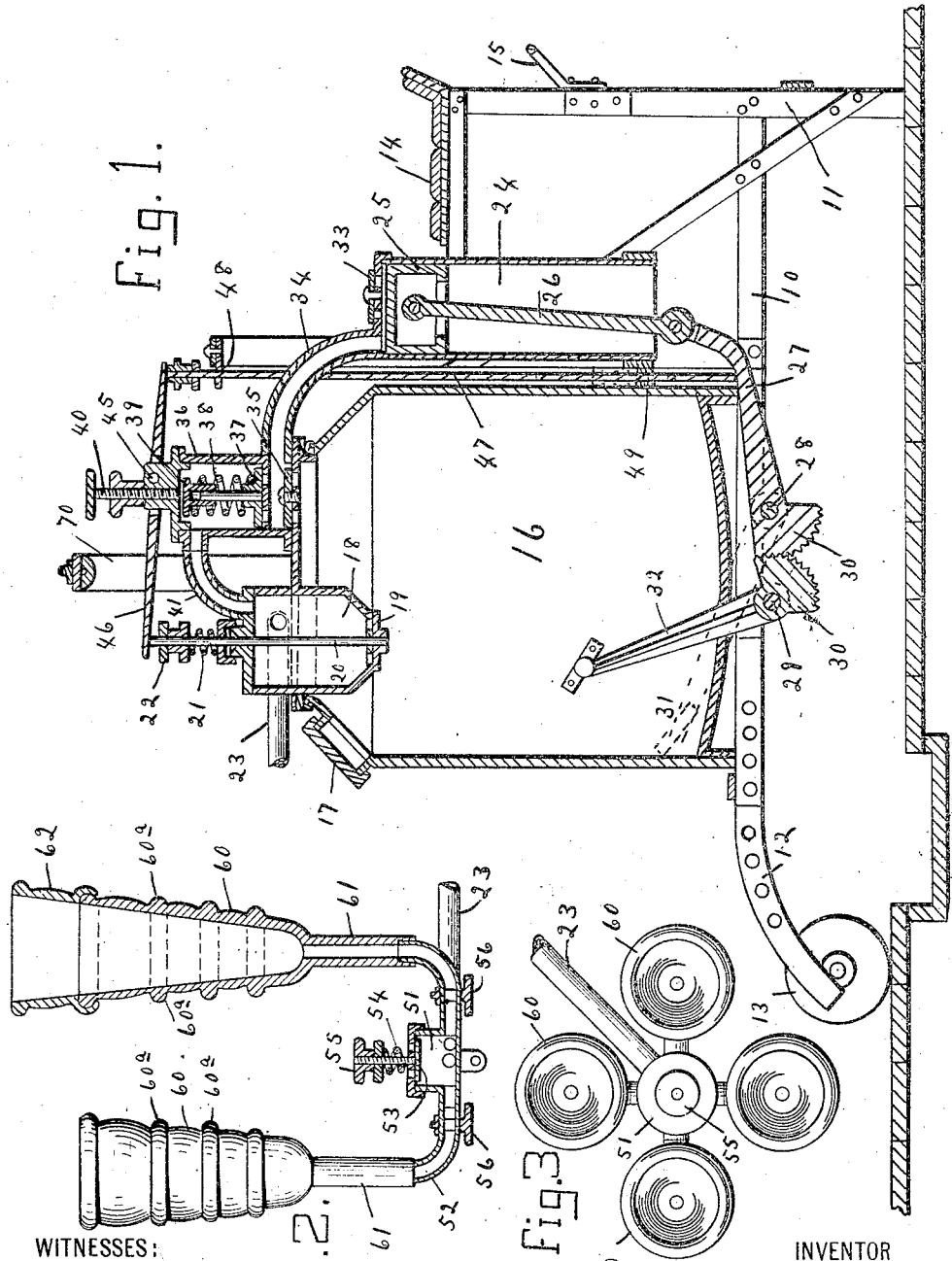

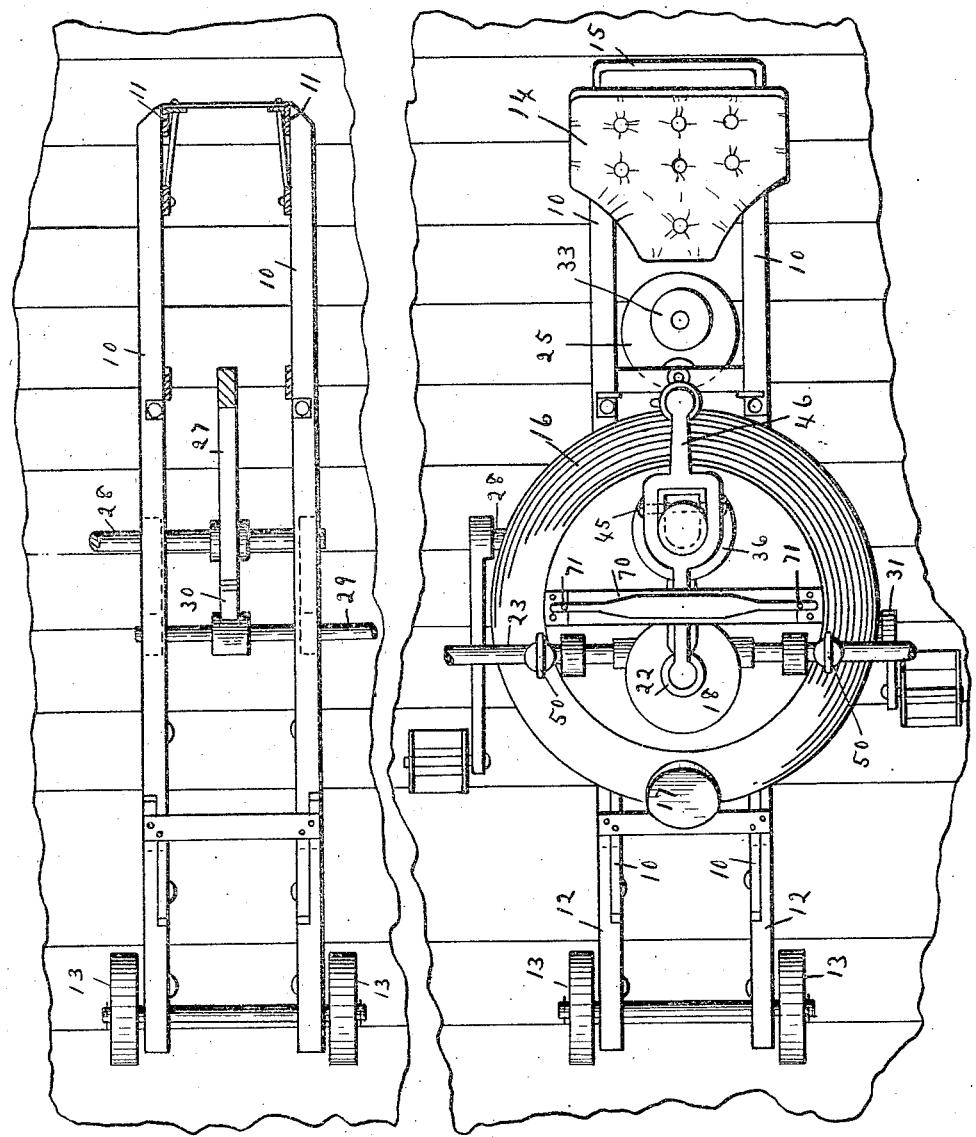

WILLIAM J. UEBLER, OF WEST SCHUYLER, NEW YORK.

MILKING-MACHINE.

935,338.  Specification of Letters Patent.  Patented Sept. 28, 1909.

Application filed February 11, 1908. Serial No. 415,307.

*To all whom it may concern:*

Be it known that I, WILLIAM J. UEBLER, of West Schuyler, in the county of Herkimer and State of New York, have invented certain new and useful Improvements in Milking-Machines; and I do hereby declare that the following is a full, clear, and exact description thereof, which will enable others skilled in the art to which it appertains to make and use the same, reference being had to the accompanying drawings, and to the figures of reference marked thereon, which form part of this specification.

The object of my present invention is to provide a portable, manually-operated milking machine, adapted for operation on two cows simultaneously, and which is simple in construction and efficient in operation and well adapted to fill the requirements of a practicable machine of this character.

Figure 1 shows a vertical section of a machine of my present improved construction. Fig. 2 is a partial side elevation and partial sectional view of the teat cups employed in connection with the machine proper. Fig. 3 is a plan view of the set of teat cups with their appurtenances. Fig. 4 is a plan view of the machine. Fig. 5 is a plan view of the frame on which the machine is mounted, together with some details of construction.

Referring to the reference figures in a more particular description, 10—10 indicates the frame bars on which the working parts of the machine are mounted, and which are supported at one end by posts 11—11, and are provided at the other end with curved adjustable arms 12 supported on a truck having wheels 13. The posts 11 are carried upwardly, and, in connection with other frame bars, support a seat 14 for the operator and carry a handle 15 by means of which the machine may be handled and moved about, one end carried or supported by the operator, while the other end is carried by the truck, the truck having the wheels 13.

Secured to and supported on the frame is the main milking receiving receptacle 16, which is a closed receptacle provided with a tight cover 17 which may be removed to discharge the contents of the receptacle. Arranged in the top of the receptacle 16 and partially entering the same preferably, is the preliminary receiving chamber 18. This chamber is a closed chamber, except that it is provided with an opening or openings in the bottom into the receptacle 16 adapted to be closed by a valve 19. The valve 19 is mounted on a stem 20 and is held to closed position by a spring 21 arranged under the adjustable nut 22 on the upper end of the stem. One or more flexible tubes 23, preferably two, are provided connected with the upper portion of the receiving chamber 18 and extending to sets of teat cups.

Secured on one side of the receptacle 16 is the exhaust pump cylinder 24. The cylinder 24 contains the reciprocating plunger or piston 25. The piston 25 is connected by a connecting rod 26 with the swinging end of a lever arm 27 secured on a rock shaft 28 mounted on the frame. A second rock shaft 29, also mounted on the frame, is provided and the two shafts 28 and 29 are connected together for simultaneous movement by a pair of intermeshing gear sectors 30. On the outer end of one of the shafts, as 28, is secured a treadle lever 31, while on the outer end of the other shaft is secured another treadle lever 32. It is obvious that by alternately pressing on first one and then on the other of these treadle levers, the operator by means of his feet can reciprocate the plunger 25 in the cylinder 24. In the head of the cylinder 24 are provided outlet openings, which are closed against ingress of air by a valve 33, preferably in the nature of a flexible washer. The upper end of the cylinder 24 is connected with an opening in the upper end of the main receptacle 16 by a pipe 34. The opening into the receptacle 16 is closed against air entering by a valve 35 in the nature of a flexible washer secured over the opening. Surrounding the opening closed by the valve 35 is a valve chamber 36. This chamber has a valve seat with openings closed by a valve 37 held under tension by a spring 38. The spring 38 is confined between the valve 37 and the adjustable cap 39, the adjustment of the cap being effected by a screw 40 passing through the head of the valve chamber 36. The pipe 34 opens into the valve chamber 36 under the seat of the valve 37 and to the same space occupied by the valve 35. The portion of the chamber 36 above the valve 37 is placed in communication with the top of the receiving chamber 18 by a pipe 41.

Pivotally mounted on the top of the chamber 36 at 45 is a rocking lever 46, one end of which is adapted to engage with and operate on the upper end of the valve stem, while the other end is adapted to engage with and be operated by a rod or connection 47 extending from the lever 46 to a position to be engaged by and operated by the lever arm 27. The connection 47 will be mounted in bearings, as 48 and 49, to provide for a limited amount of longitudinal vertical movement.

At the receptacle 16 the milk pipes 23 may be provided with a stop cock 50, whereby they may be shut off, which stop cock is particularly useful when two or more pipes are provided, and at the teat cups the pipes 23 will connect with a chamber in the head 51 which has four tubular branches, as 52, with which the teat cups are directly connected. The chamber 51 will preferably have an inlet opening controlled by a valve 53, held closed by a spring 54 and adapted to be manually operated by means of the knob 55. Each of the tubular branches 52 will preferably be provided with a stop cock 56 and be given an upward direction at their ends for the more ready attachment of the teat cups.

The teat cups consist of a generally hollow cone-shaped body 60 continued at their lower ends in a pipe section 61 adapted to be attached to the pipe 52 and open at their upper ends to receive the teat. These teat cups are of elastic rubber and at intervals provided with external encircling ribs as 60ª, one of the ribs acting as a bead at the upper end of the cup. The walls of the cup gradually increase in strength and thickness from the top downwardly, as shown in the sectional view in Fig. 2, and between the ribs are defined by an outwardly bowing curved line on the outer side, and a straight line on the inside, whereby the walls become relatively thinner adjacent to the ribs and thickest at the point substantially midway between the ribs. This construction of teat cup is particularly efficient and well adapted for use with the machine herein described. In order to increase the length of the teat cup, an extension piece 62 is provided having as to its lower end an internal groove fitting the bead on the upper end of the regular body of the teat cup, and being formed from pliable material, as rubber, and having the same general form of walls as the regular body of the teat cup.

The machine mounted on the frame as described may be readily brought by the operator and stationed between two animals held in stanchions in the stable in the usual manner. A few strokes by the operator of the treadles will exhaust the air from the main receptacle 16 to an extent necessary to begin operations. As the piston 25 descends in its operation it draws air into the cylinder from the receptacle 16 through the opening closed by the valve 35, and through the pipe 34. As the piston 25 ascends, the air is forced out through the openings closed by the valve 33, except as to a certain portion hereafter referred to. With each stroke of the piston, particularly when a complete up stroke of the piston is effected, the valve 19 is open and the chamber 18 is exhausted into the main receptacle 16, so that there will be an equal degree of rarefication in both. The teat cups may then be applied and the stop cocks 50 and 56 opened. The general arrangement of the machine is such that the operator will be conveniently located with reference to two animals, so that he can apply and manage two sets of teat cups simultaneously, if desired.

When the teat cups are applied the operator continues to operate the piston 25 by means of the treadles, as before described. With each down stroke of the piston the receptacle is exhausted more or less. With each up stroke of the piston a certain amount of air will be accumulated in the pipe 34 and passed through the opening closed by the valve 37 and passed into the receiving chamber 18, which will temporarily reduce the rarefication in this chamber to a certain extent, as may be desired, considering the work being performed by the cups. The amount of the reduction in the vacuum tension in the chamber 18 will be regulated and controlled by the tension on the spring 38. At each complete up stroke of the piston 25 the valve 19 will be open and any air taken in through the teat cups, the teat cup connections or the pipe 41 into the chamber 18, as well as any milk taken into this chamber, will be discharged into the receptacle 16 and the chamber 18 again brought to a degree of rarefication equal to that existing in the main receptacle.

The valve 19 is only opened at the limit of the upstroke of the piston, and the introduction of air into the chamber 18 from the cylinder 24 is prior to the opening of this valve, so that there is a pulsation incident to the reduction of the degree of suction at the teat cups.

At the conclusion of the milking or at any other time, at the will of the operator, air can be let into the chamber of the teat cup head by opening the valve 53 manually. This will facilitate the removal of the milk contained in the connections and pipe 23 into the receiving chamber 18. In order to facilitate the carrying of the teat cups on the machine, a bow frame 70 is provided on the upper end of the main receptacle carrying hooks 71 upon which the teat cup head can be engaged when the teat cups are not in actual use.

It is evident that numerous changes and modifications may be made in and from the construction described without departing from the spirit of my invention.

What I claim as new and desire to secure by Letters Patent is:

1. In a milking machine, the combination of a main closed receptacle, a closed relatively small preliminary receiving chamber opening into the main receptacle, a valve controlling the passage from the preliminary chamber into the main receptacle, means for exhausting the main receptacle, teat cups connected with the receiving chamber and means for periodically placing the preliminary chamber in communication with the main receptacle, substantially as set forth.

2. In a milking machine, the combination of a main closed milk receiving receptacle, a closed relatively small preliminary chamber opening into the main receptacle, a valve controlling the passage from the preliminary chamber into the main receptacle, means for exhausting the main receptacle, means for periodically placing the preliminary chamber in communication with the main receptacle, means for periodically reducing the tension of a partial vacuum in the preliminary chamber, and teat cups connected with the preliminary receiving chamber, substantially as set forth.

3. In a milking machine the combination of a main closed receiving receptacle, a pump for exhausting said receptacle, a closed relatively small preliminary chamber arranged above and opening into the main receptacle, a valve controlling the passage from the preliminary chamber into the main receptacle, means operating in connection with the pump for controlling said valve, means for reducing the vacuum pressure in the preliminary chamber, and teat cups connected with the preliminary chamber, substantially as set forth.

4. A teat cup of elastic material of a general conical form, having a plain interior surface and a set of encircling integral elastic ribs on its outer surface, substantially as set forth.

5. A teat cup of elastic material having a general conical form both as to its exterior and interior, and external encircling integral elastic ribs, the walls of the cup gradually thickening from the enlarged open end toward the small delivery end, substantially as set forth.

6. A teat cup of elastic material and of a general conical form both as to its exterior and interior surfaces, having a set of integral elastic encircling ribs on its exterior surface, the walls of the cup being made relatively thin adjacent to the ribs and relatively thick at a point intermediate the ribs, substantially as set forth.

7. The combination in a milking machine of a closed main receiving receptacle, a preliminary closed receiving chamber mounted in the top of the main receptacle and opening through its bottom into the main receptacle, a valve closing the opening between the preliminary chamber and the main receptacle, a pump for exhausting the main receptacle, treadle mechanism for operating the pump, a tripping mechanism operating in connection with the pump mechanism for opening the valve between the receiving chamber and the main receptacle, teat cups connected with the receiving receptacle, and means in connection with the pumping mechanism for introducing more or less air into the preliminary receiving chamber, substantially as set forth.

In witness whereof, I have affixed my signature, in presence of two witnesses, this 4 day of Feb. 1908.

WM. J. UEBLER.

Witnesses:
E. S. HESSE,
GEO. E. RENDELL.